(12) United States Patent
Kotsuji et al.

(10) Patent No.: US 10,047,853 B2
(45) Date of Patent: Aug. 14, 2018

(54) OIL PRESSURE CONTROLLER FOR AUTOMATIC TRANSMISSION

(71) Applicant: JATCO Ltd, Fuji-shi, Shizuoka (JP)

(72) Inventors: Kouichi Kotsuji, Numazu (JP); Kenji Hattori, Kanagawa (JP)

(73) Assignee: JATCO Ltd, Fuji-Shi (JP)

( * ) Notice: Subject to any disclaimer, the term of this patent is extended or adjusted under 35 U.S.C. 154(b) by 353 days.

(21) Appl. No.: 14/915,837

(22) PCT Filed: Aug. 27, 2014

(86) PCT No.: PCT/JP2014/072365
§ 371 (c)(1),
(2) Date: Mar. 1, 2016

(87) PCT Pub. No.: WO2015/037435
PCT Pub. Date: Mar. 19, 2015

(65) Prior Publication Data
US 2016/0208910 A1  Jul. 21, 2016

(30) Foreign Application Priority Data

Sep. 13, 2013  (JP) .................................. 2013-190416

(51) Int. Cl.
*F16H 61/00* (2006.01)
*F16H 61/02* (2006.01)
(Continued)

(52) U.S. Cl.
CPC ....... *F16H 61/0021* (2013.01); *F16D 48/066* (2013.01); *F16H 61/0265* (2013.01);
(Continued)

(58) Field of Classification Search
None
See application file for complete search history.

(56) References Cited

U.S. PATENT DOCUMENTS

| 5,733,220 A | 3/1998 | Iizuka | |
|---|---|---|---|
| 2004/0231951 A1* | 11/2004 | Hasegawa | ................ B60T 7/12 |
| | | | 192/220 |

FOREIGN PATENT DOCUMENTS

| JP | 03-028571 A | 2/1991 |
|---|---|---|
| JP | 05-010431 A | 1/1993 |

(Continued)

*Primary Examiner* — Jacob S. Scott
(74) *Attorney, Agent, or Firm* — Foley & Lardner LLP

(57) ABSTRACT

Oil pressure controller for an automatic transmission produces a pre-charge shelf pressure supplied to a starter clutch by rapidly decreasing a command hydraulic pressure to the starter clutch after temporarily rapidly increasing the command hydraulic pressure, also produces a capacity adjustment pressure (Pb1 or Pb2) of the starter clutch by gradually increasing the hydraulic pressure from a decrease point of the pre-charge shelf pressure (Pa), when a selecting operation is made from N-range to D-range. By changing capacity adjustment pressure (Pb1 or Pb2) according to brake-operating/nonoperating state, capacity adjustment pressure (Pb1) in the brake-nonoperating state is set to be higher than capacity adjustment pressure (Pb2) in the brake-operating state by an offset hydraulic pressure amount. With this, when the selecting operation is made from N-range to D-range, in the brake-operating state, selection shock of the starter clutch can be reduced. In the brake-nonoperating state, good vehicle startability can be achieved.

4 Claims, 11 Drawing Sheets

FIG.15

(51) Int. Cl.
*F16H 61/04* (2006.01)
*F16H 59/54* (2006.01)
*F16H 59/72* (2006.01)
*F16D 48/06* (2006.01)

(52) U.S. Cl.
CPC . *F16H 61/0437* (2013.01); *F16D 2500/1085* (2013.01); *F16D 2500/50224* (2013.01); *F16D 2500/50239* (2013.01); *F16D 2500/50293* (2013.01); *F16D 2500/70406* (2013.01); *F16H 59/54* (2013.01); *F16H 59/72* (2013.01); *F16H 2061/0488* (2013.01); *F16H 2342/044* (2013.01)

(56) References Cited

FOREIGN PATENT DOCUMENTS

| | | |
|---|---|---|
| JP | H05-10431 A | 1/1993 |
| JP | 11-037261 A | 2/1999 |
| WO | WO-2007/049680 A1 | 5/2007 |

\* cited by examiner

OIL PRESSURE CONTROLLER FOR AUTOMATIC TRANSMISSION

The present invention relates to an oil pressure controller for an automatic transmission mounted in a vehicle, and more particularly to an oil pressure controller of the automatic transmission which is capable of achieving both of reduction in so-called selection shock and improvement in vehicle startability when a selecting operation is made from a neutral range to a drive range.

BACKGROUND ART

Such technique has been proposed, for instance, in Patent Document 1. An oil pressure controller disclosed in this Patent Document 1 has a pre-charge pressure control unit that after temporarily rapidly increasing a hydraulic fluid pressure, rapidly decreases the hydraulic fluid pressure then produces a shelf pressure for pre-charge and a capacity adjustment pressure control unit that gradually increases the hydraulic fluid pressure from a decreased point of a pre-charge pressure and produces a capacity adjustment pressure of a frictional engagement element, when inputting a range signal upon change of the range from the neutral range (N-range) to the drive range (D-range or R-range).

By rapidly decreasing the hydraulic fluid pressure after temporarily rapidly increasing the hydraulic fluid pressure upon the change of the range from the neutral range to the drive range by the pre-charge pressure control unit, preparation for an engagement of the frictional engagement element is promptly made, and after that, by so-called gentle pressure increase that gradually increases the hydraulic fluid pressure by the capacity adjustment pressure control unit, a shock when the frictional engagement element is completely engaged is reduced, thereby achieving both of completion of selection in a short time and reduction of the shock.

In a case of the technique disclosed in Patent Document 1, however, each of the shelf pressure and the capacity adjustment pressure upon the selection is uniquely set irrespective of brake-operating/nonoperating state. Although a degree of the shock transmitted to a vehicle is different between the brake-operating state and the brake-nonoperating state, this point is not taken into consideration at all. For this reason, there is still room for improvement in the achievement of both of the completion of selection in a short time and the reduction of the shock.

Further, from a different viewpoint, in the case of the technique disclosed in Patent Document 1, it can be estimated that each of the shelf pressure and the capacity adjustment pressure upon the selection is set to a compromise and intermediate hydraulic pressure with consideration given to both of the reduction of the selection shock and the vehicle startability, irrespective of the brake-operating/nonoperating state and driver's intention.

For this reason, under circumstances where the driver desires the vehicle startability, although sensitivity of the driver to the selection shock becomes lower, since each of the shelf pressure and the capacity adjustment pressure is set to a hydraulic pressure with consideration given to the selection shock, it takes a time to engage the frictional engagement element, then this causes deterioration of the vehicle startability. On the other hand, under circumstances where sensitivity to the vehicle startability is low, since each of the shelf pressure and the capacity adjustment pressure is set to a hydraulic pressure with consideration given to the vehicle startability, the shock occurs upon engagement of the frictional engagement element, then this gives an odd or awkward feeling to the driver, which is undesirable.

CITATION LIST

Patent Document

Patent Document 1: Japanese Unexamined Patent Application Publication No. JPH03-28571

SUMMARY OF THE INVENTION

The present invention was made in view of the above problem. An object of the present invention is therefore to provide an oil pressure controller for the automatic transmission which is capable of reducing the selection shock in the brake-operating state and achieving a good vehicle startability in the brake-nonoperating state when the selecting operation is made from the neutral range to the drive range.

An oil pressure controller for an automatic transmission of the present invention is a controller that produces a pre-charge shelf pressure supplied to a starter clutch by rapidly decreasing a command hydraulic pressure to the starter clutch after temporarily rapidly increasing the command hydraulic pressure, also produces a capacity adjustment pressure of the starter clutch by gradually increasing the command hydraulic pressure after decreasing the pre-charge shelf pressure, when a selecting operation is made from a neutral range to a drive range. The oil pressure controller has a brake state detecting unit that detects a brake-operating/nonoperating state of a vehicle mounting the automatic transmission. The oil pressure controller sets the command hydraulic pressure in the brake-nonoperating state to be higher than the command hydraulic pressure in the brake-operating state, and sets the capacity adjustment pressure in the brake-nonoperating state to be higher than the capacity adjustment pressure in the brake-operating state.

According to the present invention, when the brake is in the brake-nonoperating state upon the selecting operation from the neutral range to the drive range, since it is conceivable that a driver desires the vehicle startability and driver's sensitivity to the selection shock is low, by setting the capacity adjustment pressure to be high, the starter clutch can be immediately engaged, and good vehicle startability can be achieved. On the other hand, when the brake is in the brake-operating state upon the selecting operation from the neutral range to the drive range, since it is conceivable that the driver's sensitivity to the vehicle startability is low, by setting the capacity adjustment pressure to be lower than that of the brake-OFF state, the selection shock is further reduced.

EMBODIMENTS FOR CARRYING OUT THE INVENTION

Figure 1:
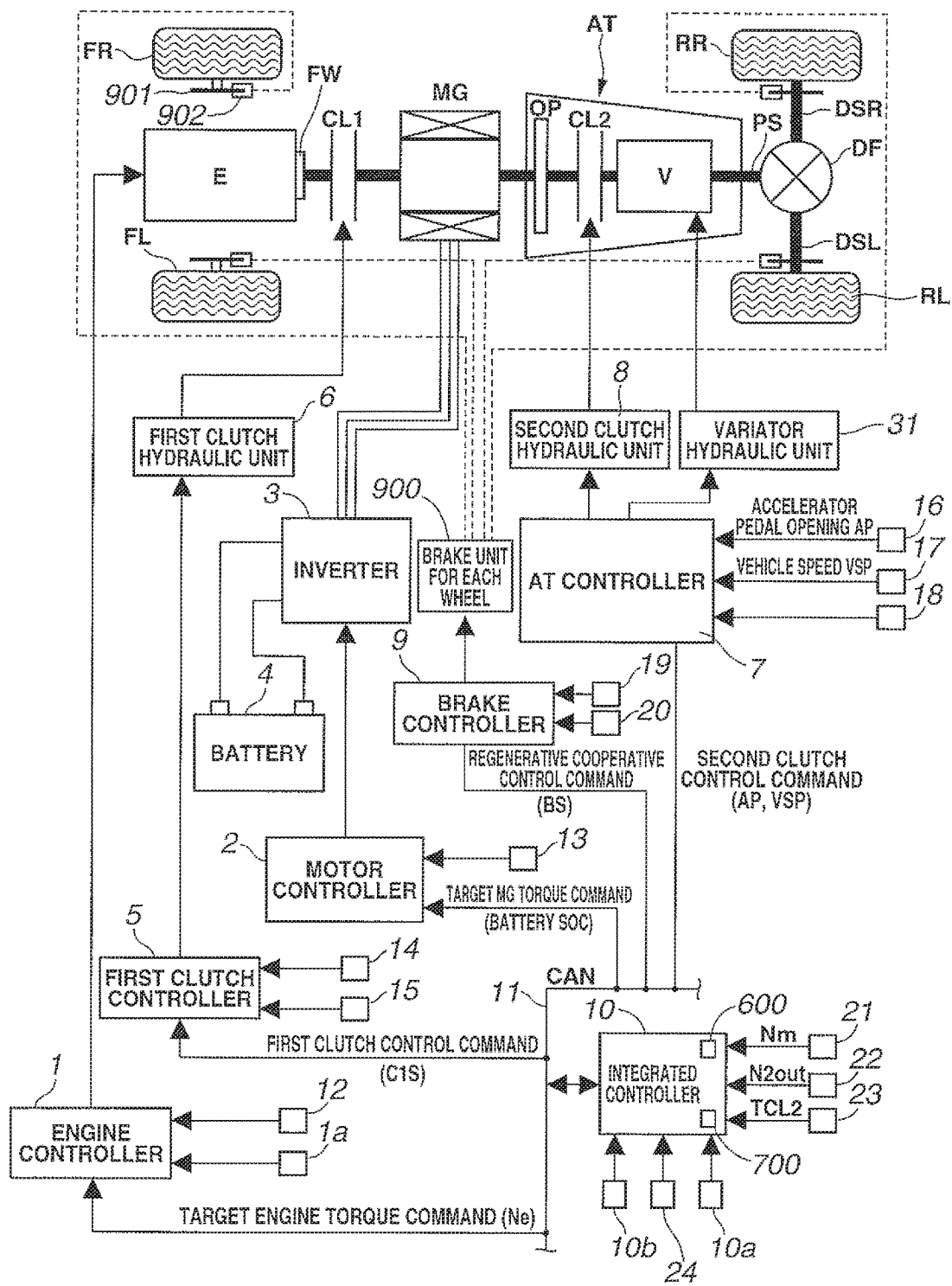
FIG. 1 is a general system diagram showing a rear-wheel-drive hybrid vehicle to which the present invention is applied.

FIGS. 1 to 15 are drawings showing a detailed first embodiment for carrying out the present invention. FIG. 1 is a general system diagram showing a rear-wheel-drive hybrid vehicle to which a controller for the vehicle of the present invention is applied. First, a drive system of the hybrid vehicle will be explained. The hybrid vehicle shown in FIG. 1 has an engine E, a first clutch CL1, a motor/generator MG, an automatic transmission AT, a propeller shaft PS, a differential gear DF, a left drive shaft DSL, a right drive shaft DSR, a rear-left wheel (driving wheel) RL and a rear-right wheel (driving wheel) RR. The automatic transmission AT includes an oil pump OP, a second clutch CL2 and a variator V. Here, FL is a front-left wheel, and FR is a front-right wheel.

The engine E is, for instance, a gasoline engine, and a valve opening of throttle valve etc. is controlled on the basis of a control command from an after-mentioned engine controller 1. The engine E functions as a rotation driving source that generates a travelling driving force for the vehicle, together with the motor/generator MG. Further, a flywheel FW is provided at an output shaft of the engine E.

The first clutch CL1 is a clutch that is interposed between the engine E and the motor/generator MG. Engagement and disengagement including slip-engagement of the first clutch CL1 are controlled by a control pressure produced by a first clutch hydraulic unit 6 on the basis of a control command from an after-mentioned first clutch controller 5.

The motor/generator MG is a synchronous motor/generator in which a permanent magnet is embedded in a rotor and a stator coil is wound around a stator. On the basis of a control command from an after-mentioned motor controller 2, the motor/generator MG is controlled and driven through application of a three-phase alternating current that is generated by an inverter 3. This motor/generator MG acts as an electric motor that is driven and rotates by receiving power supply from a battery 4 (hereinafter, this state is called a power running state). Also, in a case where the rotor is rotated by an external force, the motor/generator MG acts as a generator that generates an electromotive force at both ends of the stator coil, and is able to charge the battery 4 (hereinafter, this operating state is called a regenerative state). The rotor of this motor/generator MG is connected to an input shaft of the automatic transmission AT through a damper (not shown).

The second clutch CL2 is a clutch that is interposed between the oil pump OP and the variator V in the automatic transmission AT. Engagement and disengagement including slip-engagement of the second clutch CL2 are controlled by a control pressure that is produced by a second clutch hydraulic unit 8 on the basis of a control command from an after-mentioned AT controller 7.

The automatic transmission AT is a transmission with the second clutch CL2 and a well-known so-called belt type continuously variable transmission being main components. The automatic transmission AT is formed from the variator V, having an input side primary pulley, an output side secondary pulley and a belt wound around these both pulleys, a forward/backward travel changing mechanism (not shown) and the oil pump OP connected to a transmission input shaft. The variator V is a variator that controls a transmission ratio according to a vehicle speed and an accelerator opening by a control pressure produced by a variator hydraulic unit 31 on the basis of a control command from the AT controller 7. Here, the second clutch CL2 is not a clutch that is newly added as a special clutch, but a clutch that is engaged at a forward travel of the automatic transmission AT or a brake that is engaged at a backward travel of the automatic transmission AT.

An output shaft of the automatic transmission AT is connected to the rear-left and rear-right wheels RL, RR through the propeller shaft PS as a vehicle drive shaft, the differential gear DF, the left drive shaft DSL and the right drive shaft DSR. With regard to the first and second clutches CL1 and CL2, for example, a wet multiple disc clutch whose hydraulic flow amount and hydraulic pressure can be continuously controlled by a proportional solenoid is used.

A brake unit 900 has a hydraulic pump and a plurality of electromagnetic valves. The brake unit 900 is configured to secure a hydraulic pressure corresponding to a required braking torque by pressure increase by the pump and to be able to perform so-called brake-by-wire control that controls a wheel cylinder pressure by valve open/closure control of the electromagnetic valve for each wheel. Each of the wheels FR, FL, RR and RF is provided with a brake rotor 901 and a caliper 902, and a frictional braking torque is generated by a brake hydraulic pressure (a brake fluid pressure) supplied from the brake unit 900. Here, as a hydraulic pressure source, a type having an accumulator could be used. Further, instead of a hydraulic brake, a configuration having an electric caliper could be used.

This hybrid drive system has three drive modes in accordance with a state of the engagement/disengagement of the first clutch CL1. A first drive mode is an electric vehicle drive mode (hereinafter called an EV drive mode) as a motor-used drive mode in which the first clutch CL1 is in a disengaged state and the vehicle travels by only power of the motor/generator MG as a power source. A second drive mode is an engine-used drive mode (hereinafter called an HEV drive mode) in which the first clutch CL1 is in an engaged state and the vehicle travels while including the engine E as the power source. A third drive mode is an engine-used slip drive mode (hereinafter called a WSC drive mode) in which the first clutch CL1 is in the engaged state and the second clutch CL2 is slip-controlled then the vehicle travels while including the engine E as the power source. This WSC drive mode is a mode that is capable of achieving a creep drive especially when a state of charge of a battery (SOC) is low or an engine water temperature is low. Here, when changing the mode from the EV drive mode to the HEV drive mode, the first clutch CL1 is engaged, and a start of the engine E is carried out by using torque of the motor/generator MG.

With regard to the HEV drive mode, it has three drive modes; an engine drive mode, a motor assist drive mode, and a travelling power generation mode.

The engine drive mode is a mode that drives the driving wheels with only the engine E being the power source. The motor assist drive mode is a mode that drives the driving wheels with both of the engine E and the motor/generator MG being the power source. The travelling power generation mode is a mode that drives the driving wheels RL, RR with the engine E being the power source also simultaneously operates the motor/generator MG as the generator.

Ata constant speed drive and an acceleration drive, the motor/generator MG works as the generator by using the power of the engine E. At a deceleration drive, by receiving a regenerative brake energy, the motor/generator MG generates the power, and this power is used to charge the battery 4. Further, as another mode, the hybrid drive system has a power generation mode in which the motor/generator MG works as the generator at vehicle stop by using the power of the engine E.

Next, a control system of the hybrid vehicle will be explained. The control system of the hybrid vehicle shown in FIG. 1 has the engine controller 1, the motor controller 2, the inverter 3, the battery 4, the first clutch controller 5, the first clutch hydraulic unit 6, the AT controller 7, the second clutch hydraulic unit 8, the variator hydraulic unit 31, a brake controller 9 and an integrated controller 10. The engine controller 1, the motor controller 2, the first clutch controller 5, the AT controller 7, the brake controller 9 and the integrated controller 10 are connected with each other through a CAN communication line 11 that allows exchange of information between them. Further, as is well known, each controller is formed from a microcomputer etc.

The engine controller 1 inputs information of an engine revolution speed (an engine rpm) from an engine rpm sensor 12, and outputs a command that controls an engine operating point (Ne: the engine revolution speed, Te: an engine torque) to, for instance, a throttle valve actuator (not shown in the drawing) in accordance with a target engine torque command etc. from the integrated controller 10. A detailed engine control will be explained later. Here, information concerning the engine revolution speed Ne etc. is sent to the integrated controller 10 via the CAN communication line 11.

The motor controller 2 inputs information from a resolver 13 that detects a rotation position of the rotor of the motor/generator MG, and outputs a command that controls a motor operating point (Nm: a motor/generator revolution speed, Tm: a motor/generator torque) of the motor/generator MG to the inverter 3 in accordance with a target motor/generator torque command etc. from the integrated controller 10. This motor controller 2 checks or watches the battery SOC indicating the charge state of the battery 4. The information of this battery SOC is used as control information of the motor/generator MG, and also is sent to the integrated controller 10 via the CAN communication line 11.

The first clutch controller 5 inputs sensor information from a first clutch hydraulic pressure sensor 14 and a first clutch stroke sensor 15, and outputs a command that controls the engagement/disengagement of the first clutch CL1 to the first clutch hydraulic unit 6 in accordance with a first clutch control command from the integrated controller 10. Information of a first clutch stroke C1S is sent to the integrated controller 10 via the CAN communication line 11.

Figure 11:
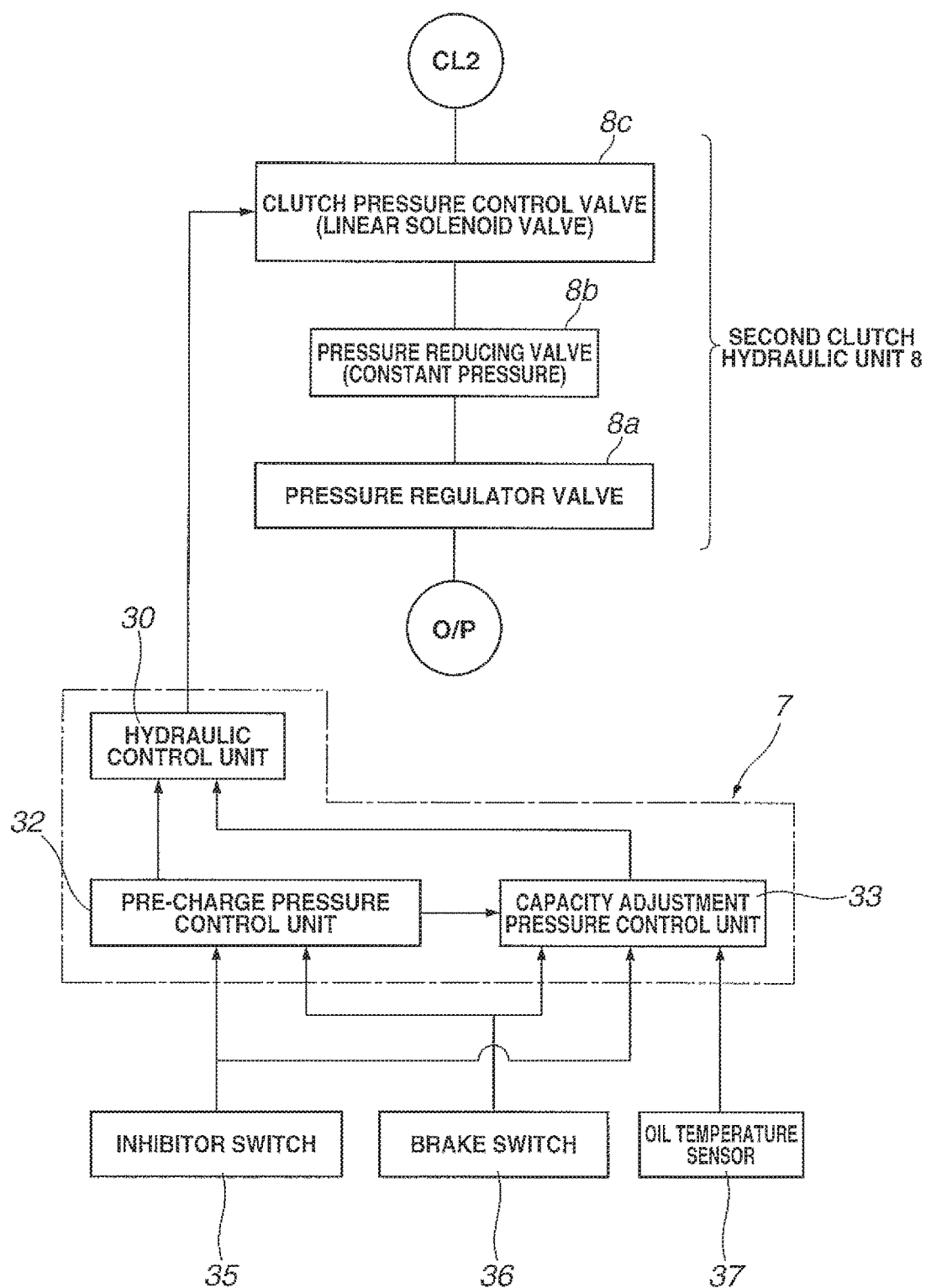
FIG. 11 is an explanatory drawing showing a detailed configuration of a second clutch hydraulic unit and an AT controller of FIG. 1.

The AT controller 7 inputs sensor information from an accelerator opening sensor 16, a vehicle speed sensor 17 and a second clutch hydraulic pressure sensor 18, and also inputs sensor information from, as shown in FIG. 11, an inhibitor switch 35 that outputs a signal corresponding to a position of a selecting lever operated by a driver and a brake switch 36. The AT controller 7 then outputs a command that controls the transmission ratio of the variator V to a target transmission ratio and a command that controls the engagement/disengagement of the second clutch CL2 to the variator hydraulic unit 31 and the second clutch hydraulic unit 8 in an AT hydraulic control valve in accordance with a second clutch control command from the integrated controller 10. Here, information of an accelerator pedal opening APO and a vehicle speed VSP and the inhibitor switch 35 is sent to the integrated controller 10 via the CAN communication line 11. Further, as shown in FIG. 11, the AT controller 7 also inputs sensor information of an oil temperature sensor 37.

The brake switch 36 is, for example, a switch that is provided at a foot brake of the vehicle. The brake switch 36 is turned ON and turned OFF in response to a brake pedal depression operation, then detects brake-operating/nonoperating state. In the present embodiment, this brake switch 36 functions as a brake state detecting unit that detects the brake-operating/nonoperating state of the vehicle.

The brake controller 9 inputs sensor information from a wheel speed sensor 19 for detecting each wheel speed of four wheels and a brake stroke sensor 20. Then, for instance, when a braking torque by only a regenerative braking torque is insufficient for driver's required braking torque determined by a brake stroke BS upon a brake operation by driver's brake pedal depression, the brake controller 9 performs a regenerative brake cooperative control on the basis of a regenerative cooperative control command from the integrated controller 10 so that the shortage of the braking torque is compensated by a mechanical braking torque (a braking torque by a friction brake). Needless to say, not only a brake hydraulic pressure corresponding to the driver's required braking torque, but also a brake hydraulic pressure can be arbitrarily produced in response to other control demand.

The integrated controller 10 is a controller that controls a consumption energy of the whole vehicle, and performs the operation in order for the hybrid vehicle to travel at a maximum efficiency. The integrated controller 10 inputs information from a motor rotation speed sensor 21 that detects a motor rotation speed Nm, a second clutch output rotation speed sensor 22 that detects a second clutch output rotation speed N2out, a second clutch torque sensor 23 that detects a second clutch transmission torque capacity TCL2, a brake hydraulic pressure sensor (a brake fluid pressure sensor) 24, a temperature sensor 10*a* that detects temperature of the second clutch CL2 and a G sensor 10*b* that detects a back-and-forth acceleration, and also inputs information obtained via the CAN communication line 11.

Further, the integrated controller 10 performs an operating control of the engine E by the control command to the engine controller 1, an operating control of the motor/generator MG by the control command to the motor controller 2, the engagement/disengagement control of the first clutch CL1 by the control command to the first clutch controller 5, the engagement/disengagement control of the second clutch CL2 by the control command to the AT controller 7 and a transmission control (a speed change control) of the variator V.

Furthermore, the integrated controller 10 has a slope load torque equivalent value operating section 600 that calculates an equivalent value of a slope load torque acting on the wheel on the basis of an after-mentioned estimated road slope and a second clutch protection controlling section 700 that when a predetermined condition is satisfied, produces a brake hydraulic pressure (a brake fluid pressure) regardless of driver's brake pedal operating amount.

The slope load torque equivalent value is a value equivalent to a load torque that acts on the wheel when gravity acts on the vehicle so as to make the vehicle move (or roll) backward by the road slope. Regarding the brake that generates the mechanical braking torque at the wheel, by pressing a brake pad to the brake rotor 901 by the caliper 902, a braking torque is generated. Therefore, when the vehicle is made to move backward by the gravity, a direction of the braking torque is a vehicle forward direction (a vehicle forward travelling direction). The braking torque that is identical to this vehicle forward direction is defined as a slope load torque. Since this slope load torque can be determined by the road slope and inertia of the vehicle, the slope load torque equivalent value is calculated on the basis of a vehicle weight etc. previously set in the integrated controller 10. However, the slope load torque equivalent value could be the slope load torque as it is, or the slope load torque equivalent value might be a value obtained by adding or subtracting a predetermined value.

The second clutch protection controlling section 700 calculates a braking torque minimum value (a braking torque that is greater than the above slope load torque) by which so-called roll back, meaning that the vehicle moves or rolls backward, can be avoided when the vehicle stops on a slope road. The second clutch protection controlling section 700 then outputs the braking torque minimum value as a control lower limit value to the brake controller 9 when a predetermined condition is satisfied (when the vehicle stops with the road slope being equal to or greater than a predetermined value).

Here, the brake hydraulic pressure is applied to only the rear wheel that is the driving wheel. However, the brake hydraulic pressure could be applied to four wheels with consideration given to distribution to the front and rear wheels, or the brake hydraulic pressure might be applied to only the front wheel.

On the other hand, when the predetermined condition is not satisfied, the second clutch protection controlling section 700 outputs a command that gradually reduces the braking torque. Further, when the predetermined condition is satisfied, the second clutch protection controlling section 700 outputs, to the AT controller 7, a command that forbids an output of transmission torque capacity control to the second clutch CL2.

Figure 2:
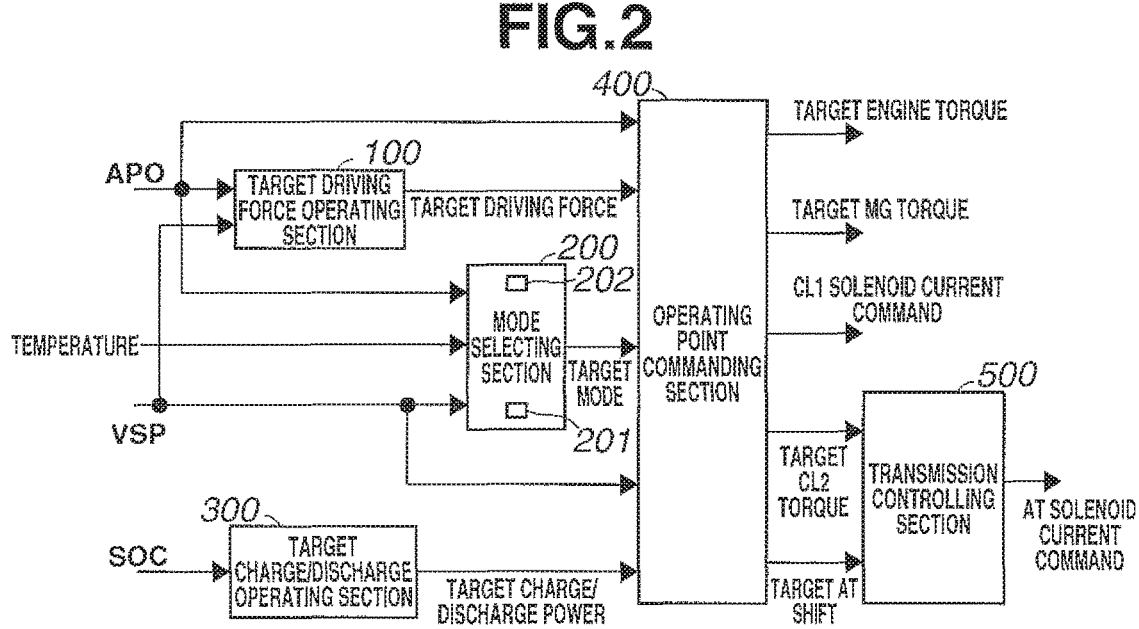
FIG. 2 is a control block diagram showing operation processes in an integrated controller of FIG. 1.

Next, control operated in the integrated controller 10 will be explained with reference to the control block diagram in FIG. 2. The operation in the integrated controller 10 is executed for instance at a control cycle period 10 msec. The integrated controller 10 has a target driving force operating section 100, a mode selecting section 200, a target charge/discharge operating section 300, an operating point commanding section 400 and a transmission controlling section (a speed change controlling section) 500.

Figure 3:
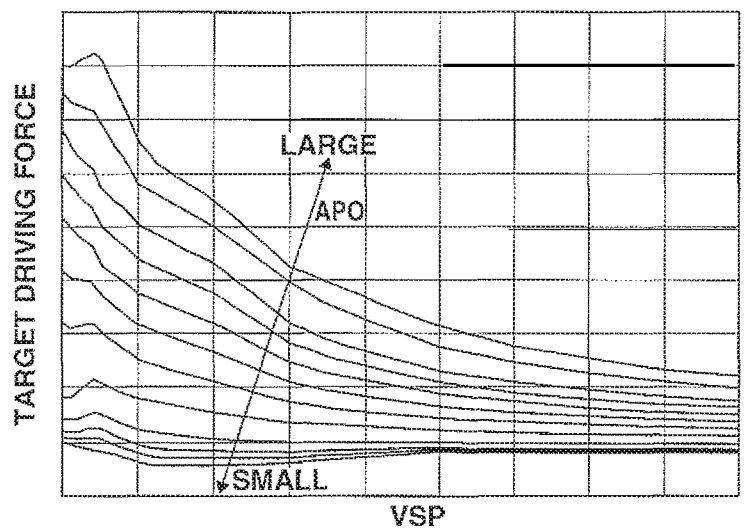
FIG. 3 is a drawing showing an example of a target driving force map used for calculation of a target driving force in a target driving force operating section of FIG. 2.

The target driving force operating section 100 calculates a target driving force tFoO (driver's required driving force) on the basis of the accelerator pedal opening APO and the vehicle speed VSP using the target driving force map shown in FIG. 3.

The mode selecting section 200 has a road slope estimation operating section 201 that estimates the slope of road on the basis of a detection value of the G sensor 10*b*. The road slope estimation operating section 201 calculates an actual acceleration from an average etc. of acceleration of the wheel speed detected by the wheel speed sensor 19, and estimates the road slope on the basis of a difference between this calculation result and the G sensor detection value.

Figure 4:
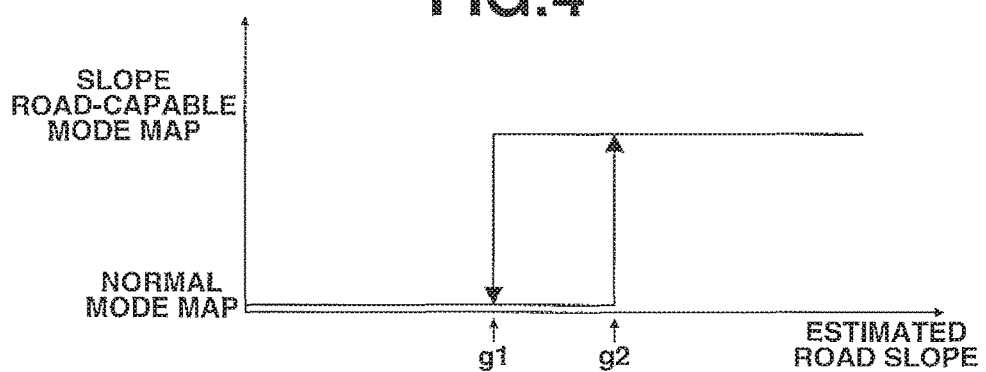
FIG. 4 is a drawing showing a relationship between a mode map and an estimated slope in a mode selecting section of FIG. 2.

The mode selecting section 200 further has a mode map selecting section 202 that selects either one of two mode maps (described later) on the basis of the estimated road slope. FIG. 4 is a schematic diagram showing selection logic of the mode map selecting section 202. The mode map selecting section 202 changes the map from a normal mode map to a slope road-capable mode map when the estimated slope becomes equal to or greater than a certain value g2 in a condition where the normal mode map is selected. On the other hand, the mode map selecting section 202 changes the map from the slope road-capable mode map to the normal mode map when the estimated slope becomes less than a certain value g1 (<g2) in a condition where the slope road-capable mode map is selected. That is to say, a hysteresis is set for the estimated slope (for the change between the both mode maps), thereby preventing a hunting upon the map change.

Figure 5:
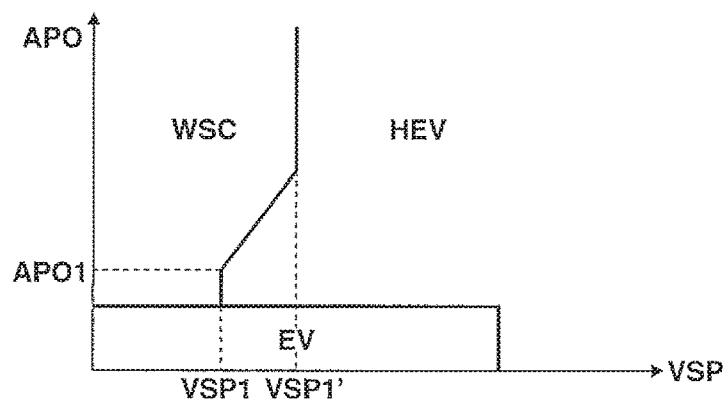
FIG. 5 is a drawing showing a normal mode map used for selection of a target mode in the mode selecting section of FIG. 2.
Figure 6:
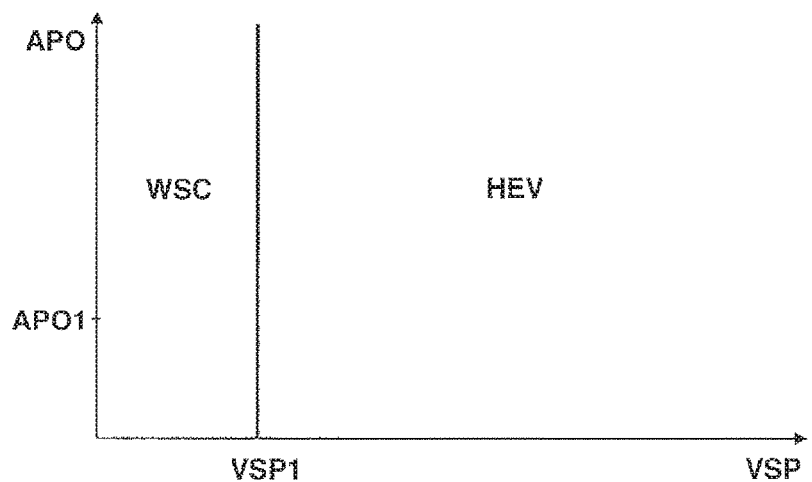
FIG. 6 is a drawing showing an MWSC-capable mode map used for selection of a target mode in the mode selecting section of FIG. 2.

Next, the mode map will be explained. As the mode map, the normal mode map that is selected when the estimated slope is less than the certain value, and the slope road-capable mode map that is selected when the estimated slope is greater than or equal to the certain value, are set. FIG. 5 illustrates the normal mode map. FIG. 6 illustrates the slope road-capable mode map.

In the normal mode map, the EV drive mode, the WSC drive mode and the HEV drive mode are set, then on the basis of the accelerator pedal opening APO and the vehicle speed VSP, the target mode is operated. However, even if the EV drive mode is selected, in a case where the battery SOC is smaller than or equal to a predetermined value, the target mode becomes the HEV drive mode or the WSC drive mode compulsorily or forcibly.

In the normal mode map in FIG. 5, with regard to an HEV WSC change line, in an area where the accelerator pedal opening APO is less than a predetermined accelerator opening APO1, the HEV WSC change line is set in an area where the vehicle speed VSP is lower than a lower limit vehicle speed VSP1 that is a vehicle speed at which an engine rpm becomes smaller than an idle speed of the engine E when the transmission ratio of the automatic transmission AT is at a low speed side. In an area where the accelerator pedal opening APO is the predetermined accelerator opening APO1 or greater, since a great driving force is required, the WSC drive mode is set up to an area of a vehicle speed VSP1' that is higher than the lower limit vehicle speed VSP1. However, this drive mode change control is configured so that when the battery SOC is low and the EV drive mode cannot be achieved, even in a case of the vehicle start, the WSC drive mode is selected.

Here, there is a case where when the accelerator pedal opening APO is large, it is difficult to achieve this request of the large accelerator pedal opening APO by the engine torque corresponding to the engine rpm around the idle speed and the torque of the motor/generator MG. Regarding the engine torque, as the engine rpm increases, more torque can be outputted. For this reason, even if the WSC drive mode is carried out up to a higher vehicle speed than the lower limit vehicle speed VSP1, by increasing the engine rpm and outputting the greater torque, the mode can change from the WSC drive mode to the HEV drive mode in a short time. This case corresponds to the WSC area that is extended or increased up to the vehicle speed VSP1' in FIG. 5.

As for the slope road-capable mode map, an EV drive mode area is not set in the slope road-capable mode map. This point is different from the normal mode map. Further, in the slope road-capable mode map, a WSC drive mode area is not changed according to the accelerator pedal opening APO, but is set only by the lower limit vehicle speed VSP1. This point is also different from the normal mode map.

Figure 7:
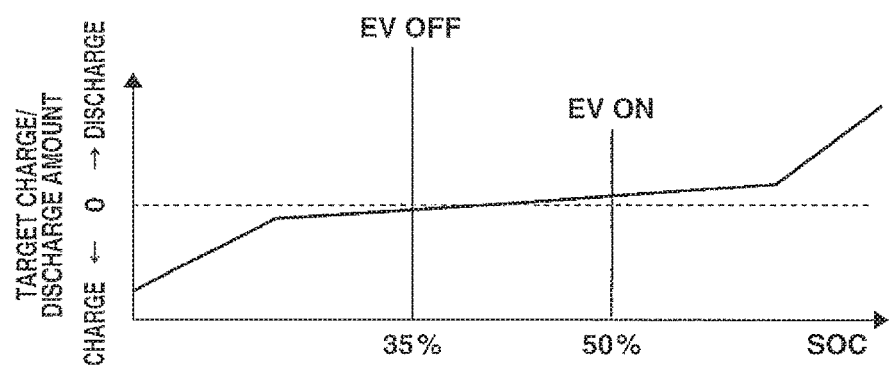
FIG. 7 is a drawing showing an example of a target charge/discharge amount map used for calculation of a target charge/discharge power in a target charge/discharge operating section of FIG. 2.

The target charge/discharge operating section 300 calculates a target charge/discharge power tP on the basis of the battery SOC using a target charge/discharge amount map shown in FIG. 7. In the target charge/discharge amount map, an EVON line (an MWSCON line) for permitting the EV drive mode is set at SOC=50%, and an EVOFF line (an MWSCOFF line) for forbidding the EV drive mode is set at SOC=35%.

When SOC is "SOC≥50%", the EV drive mode area appears in the normal mode map of FIG. 5. Once the EV drive mode area appears in the mode map, this area continues appearing until SOC falls below 35%.

When SOC is "SOC<35%", the EV drive mode area disappears in the normal mode map of FIG. 5. When the EV drive mode area disappears in the mode map, this area continues disappearing until SOC reaches 50%.

The operating point commanding section 400 calculates a transitional target engine torque, a transitional target motor/generator torque, a transitional target second clutch transmission torque capacity TCL2*, a transitional target transmission ratio of the automatic transmission AT and a transitional first clutch solenoid current command on the basis of the accelerator pedal opening APO, the target driving force tFoO (the driver's required driving force), the target mode, the vehicle speed VSP and the target charge/discharge power tP, as attainment targets of these operating points. Further, the operating point commanding section 400 is provided with an engine start controlling section that starts the engine E when changing the mode from the EV drive mode to the HEV drive mode.

The shift controlling section 500 controls drive of a solenoid valve in the automatic transmission AT to attain the target second clutch transmission torque capacity TCL2* and the target transmission ratio along a shift schedule set in a shift map. The shift map is a map in which the target transmission ratio is preset according to the vehicle speed VSP and the accelerator pedal opening APO. Here, detail of the second clutch hydraulic unit 8 that controls the second clutch CL2 is shown in FIG. 11.

<WSC Drive Mode>

Next, the WSC drive mode will be explained in detail. The WSC drive mode is characterized by the maintaining of an engine working state, and response to a change of the driver's required torque is high. More specifically, the first clutch CL1 is fully engaged, and the second clutch CL2 is slip-controlled as the transmission torque capacity TCL2 according to the driver's required torque, then the vehicle travels using the driving force of the engine E and/or the motor/generator MG.

In the hybrid vehicle shown in FIG. 1, an element such as a torque converter that absorbs a difference of rotation is not present. Thus, if the first clutch CL1 and the second clutch CL2 are fully engaged respectively, the vehicle speed is determined in accordance with the engine revolution speed. In order to maintain self-rotation of the engine E, the engine E has the lower limit determined by the idle speed. When so-called idle-up operation is carried out during engine warm-up, the idle speed, i.e. the lower limit tends to further rise. Furthermore, in the condition where the driver's required torque is high, there is a case where a rapid mode change to the HEV drive mode cannot be achieved.

On the other hand, in the EV drive mode, since the first clutch CL1 is disengaged, there is no limit on the lower limit of the above engine revolution speed. However, when the traveling by the EV drive mode is difficult due to a limit by the battery SOC, or when the driver's required torque cannot be attained by only the motor/generator MG, there is no other way than to produce a stable torque by the engine E.

Therefore, when the vehicle is in a low vehicle speed area where the vehicle speed is lower than the speed corresponding to the above lower limit also in the area where the traveling by the EV drive mode is difficult or the driver's required torque cannot be attained by only the motor/generator MG, the engine revolution speed is maintained at a predetermined lower limit revolution speed, and the second clutch CL2 is slip-controlled, then the WSC drive mode in which the vehicle travels using the engine torque is selected.

Figure 8A:
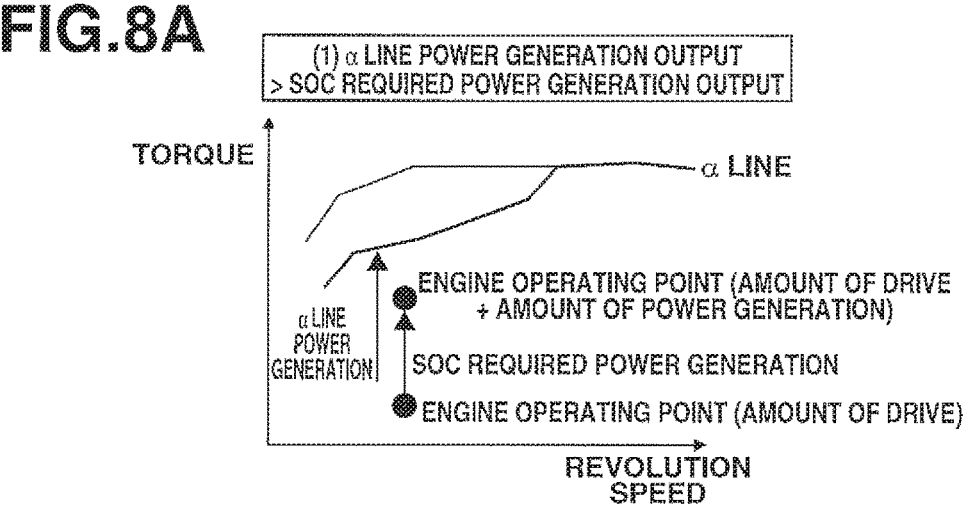
FIGS. 8A to 8C are schematic diagrams showing an engine operating point setting process in a WSC drive mode.
Figure 8B:
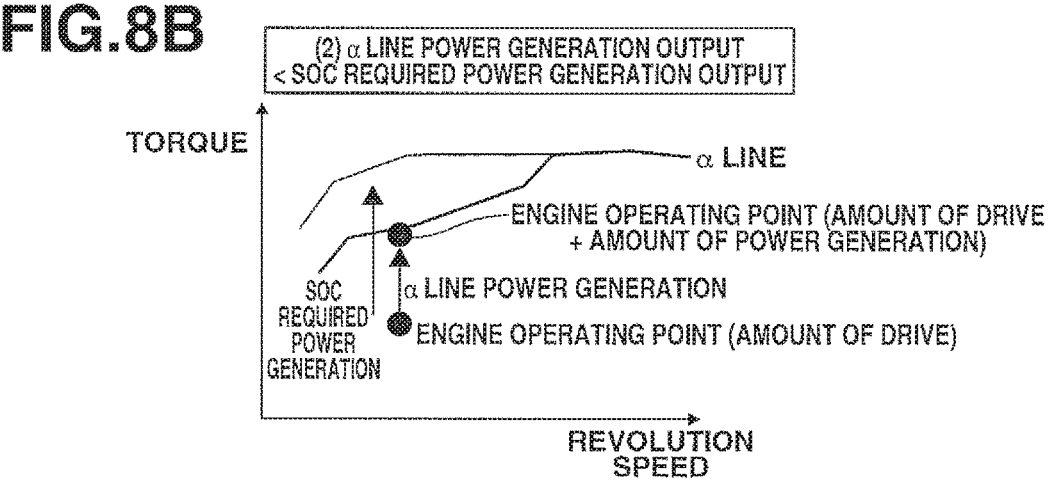
Figure 8C:
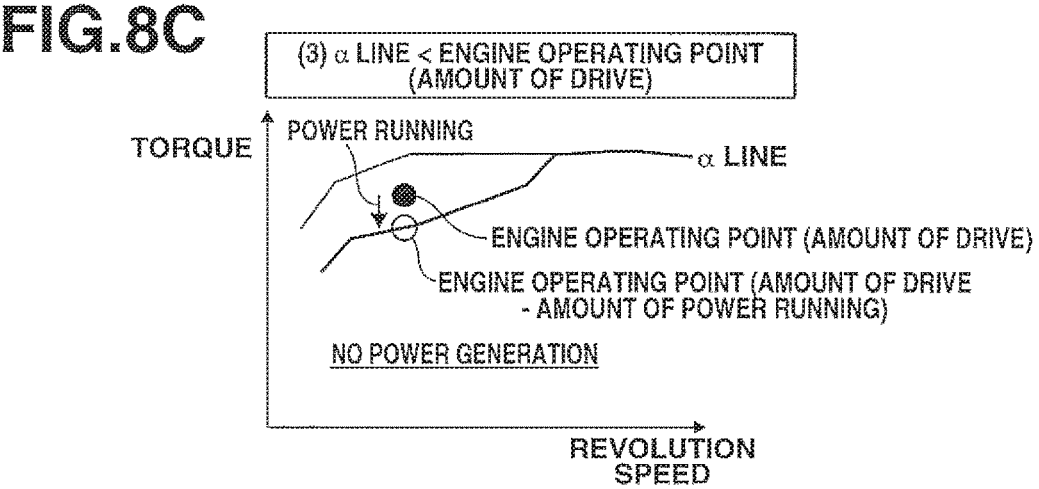
Figure 9:
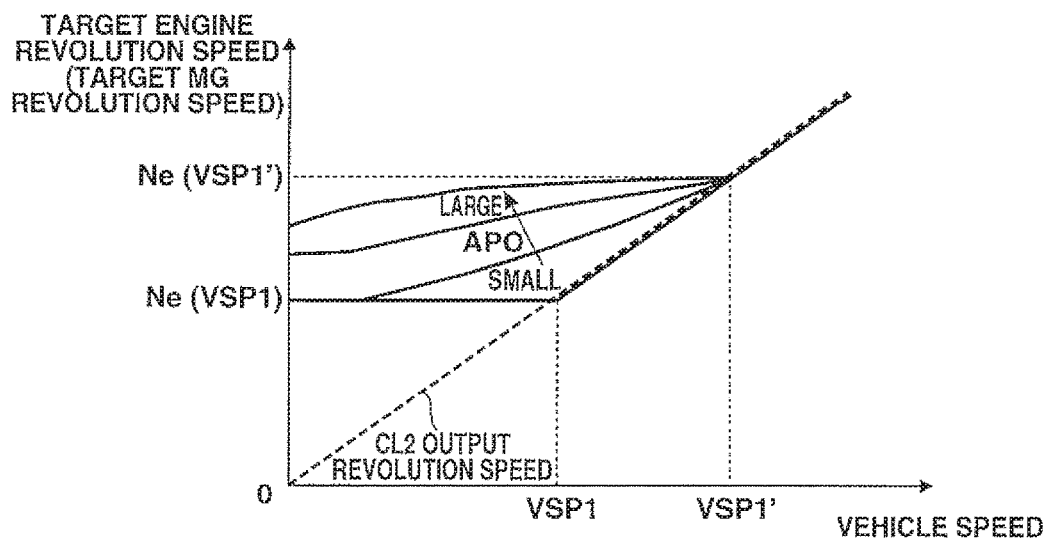
FIG. 9 is a map showing a target engine revolution speed in the WSC drive mode.

FIGS. 8A to 8C are schematic diagrams showing an engine operating point setting process in the WSC drive mode. FIG. 9 is a map showing the target engine revolution speed in the WSC drive mode. In the WSC drive mode, when the driver operates the accelerator pedal, a target engine revolution speed characteristic according to the accelerator pedal opening is selected on the basis of FIG. 9, and the target engine revolution speed according to the vehicle speed is set along this characteristic. And by the engine operating point setting process shown in FIGS. 8A to 8C, the target engine torque corresponding to the target engine revolution speed is calculated.

Here, the operating point of the engine E is defined as a point that is determined by the engine revolution speed and the engine torque. As illustrated in FIGS. 8A to 8C, with respect to the operating point, it is preferable that the operation be executed on a line (hereinafter called an α line) connecting points of high output efficiency.

However, when the engine revolution speed is set as described above, there is a case where the operating point that deviates from the α line is selected depending on driver's accelerator pedal operating amount (the driver's required torque). Therefore, in order to bring the engine operating point closer to the α line, the engine torque is feed-forward controlled to a value based on the α line.

On the other hand, as for the motor/generator MG, a revolution speed feedback control (hereinafter, called a revolution speed control) whose target revolution speed is the set engine revolution speed is executed. Here, since the engine E and the motor/generator MG are in a directly connected state, by controlling the motor/generator MG to maintain the target revolution speed, the revolution speed of the engine E is also automatically feedback-controlled (hereinafter, called a motor ISC control).

At this time, the torque outputted by the motor/generator MG is automatically controlled so that a difference between the target engine torque determined on the basis of the α line and the driver's required torque is compensated. The motor/generator MG is provided with a basic or fundamental torque control amount (regeneration/power running) to compensate for this difference, and further is feedback-controlled so as to agree with the target engine revolution speed.

In a case where the driver's required torque is smaller than a driving torque on the α line at a certain engine revolution speed, when increasing an engine output torque, an engine output efficiency is increased. At this time, by collecting or recovering the energy corresponding to this increased engine output torque by the motor/generator MG, the torque itself that is inputted to the second clutch CL2 becomes the driver's required torque, and also the power generation of good efficiency can be achieved. However, since a torque upper limit by which the motor/generator MG can generate the power is determined by the state of the battery SOC, there is a need to consider a relation of magnitude between a required power generation output (SOC required power generation power) determined by the battery SOC and a difference (a line power generation power) between a torque at a current operating point and a torque on the α line.

FIG. 8A is the schematic diagram of a case where the α line power generation power is greater than the SOC required power generation power. Since the engine output torque cannot be increased to the SOC required power generation power or greater, the operating point cannot be moved on the α line. However, by moving the operating point to a higher efficiency point, a fuel efficiency is improved.

FIG. 8B is the schematic diagram of a case where the α line power generation power is smaller than the SOC required power generation power. If the α line power generation power is within a range of the SOC required power generation power, since the engine operating point can be moved on the α line, in this case, it is possible to generate the power while maintaining the operating point of a highest fuel efficiency.

FIG. 8C is the schematic diagram of a case where the engine operating point is higher than the α line. When the operating point according to the driver's required torque is higher than the α line, with the proviso that there is a margin for the battery SOC, the engine torque is lowered, and the shortage is compensated by the power running of the motor/generator MG. With this operation, it is possible to attain the driver's required torque while improving the fuel efficiency.

Figure 10:
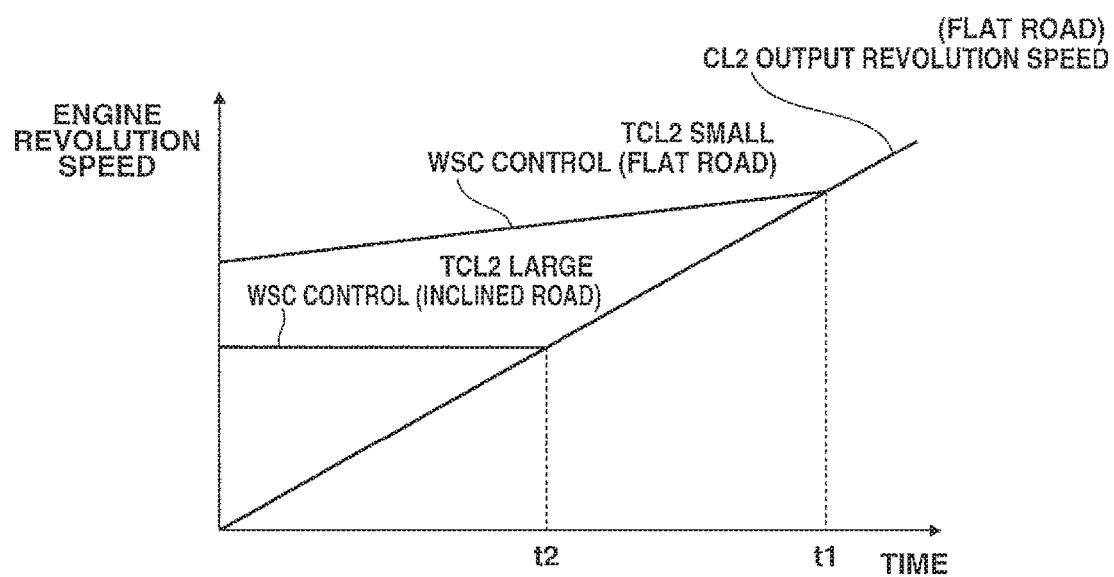
FIG. 10 is a time chart showing change of an engine revolution speed when increasing a vehicle speed in a predetermined state.

Next, a change of the WSC drive mode area according to the estimated slope will be explained. FIG. 10 is an engine revolution speed map when increasing the vehicle speed in a predetermined condition. When the accelerator pedal opening APO is greater than the accelerator opening APO1 on a flat road, the WSC drive mode area is carried out up to a vehicle speed area that is higher than the lower limit vehicle speed VSP1. At this time, as shown in the map of FIG. 9, the target engine revolution speed is gradually increased with increase in the vehicle speed. Then when the vehicle speed reaches a speed corresponding to the vehicle speed VSP1', the slip state of the second clutch CL2 disappears, and the mode is changed to the HEV drive mode.

On a slope road whose estimated slope is greater than the certain slopes (g1 or g2), when attempting to maintain the same vehicle speed increase state as the above operation, the accelerator pedal opening APO becomes large. At this time, the second clutch transmission torque capacity TCL2 becomes large as compared with the flat road. If the WSC drive mode area is extended in this condition as shown in the map of FIG. 5, the second clutch CL2 is maintained in the slip state with a strong engagement force, then there is a risk that a heat value of the second clutch CL2 will be too large. Thus, in the slope road-capable mode map in FIG. 6 that is selected in the case of the slope road whose estimated slope is great, the WSC drive mode area is not extended unnecessarily, but is set up to the area corresponding to the lower limit vehicle speed VSP1. With this setting, excessive heat generation in the WSC drive mode is avoided.

Here, in a case where the revolution speed control is difficult by the motor/generator MG, for example, in a case where the limit by the battery SOC is set, or in a case where controllability (control performance) of the motor/generator MG is not secured due to cryogenic temperature (extremely low temperature), an engine ISC control that performs the revolution speed control by the engine E is carried out.

<MWSC Drive Mode>

Next, the reason why the MWSC drive mode area is set will be explained. In the case where the estimated slope is greater than the certain slopes (g1 or g2), for instance, when attempting to maintain the vehicle in the stop state or in a slight vehicle speed traveling state without using the brake pedal operation, a large driving torque is required as compared with the flat road. This is because that there is a need to maintain the vehicle against the weight load of the vehicle.

From the viewpoint of the avoidance of the heat generation caused by the slip of the second clutch CL2, when there is the margin for the battery SOC, it could be possible to select the EV drive mode. In this case, when the mode area changes from the EV drive mode area to the WSC drive mode area, the engine start is needed. Thus, since the motor/generator MG outputs the driving torque while securing the torque for the engine start, a driving torque upper limit is narrowed or lessened unnecessarily.

Further, when only the torque is outputted to the motor/generator MG and the rotation of the motor/generator MG is stopped or is set to an extremely low revolution speed in the EV drive mode, a lock current flows to a switching element of the inverter (a phenomenon in which the current continues flowing to one switching element occurs), and there is a possibility that durability will be lowered.

Furthermore, at an area (an area of a vehicle speed VSP2 or less) that is lower than the lower limit vehicle speed VSP1 corresponding to the idle speed of the engine E when the transmission ratio of the automatic transmission AT is at a low speed side, the revolution speed of the engine E itself cannot be reduced to be lower than the idle speed. At this time, if the WSC drive mode is selected, there is a risk that the slip amount of the second clutch CL2 is large and this affects the durability of the second clutch CL2.

Especially on the slope road, since the large driving torque is required as compared with the flat road, the transmission torque capacity required of the second clutch CL2 becomes high, and the state of the high slip amount and the high torque is maintained. This tends to cause the deterioration of the durability of the second clutch CL2. In addition, since the increase of the vehicle speed becomes slow, this takes a time to change the mode to the HEV drive mode, and there is a possibility that the heat will be further generated.

Thus, the MWSC drive mode, in which the first clutch CL1 is disengaged with the engine E working, and the revolution speed of the motor/generator MG is feedback-controlled to a target revolution speed that is higher than an output speed of the second clutch CL2 by a predetermined revolution speed while controlling the transmission torque capacity of the second clutch CL2 to the driver's required driving force, is set.

That is to say, the second clutch CL2 is slip-controlled with the rotation state of the motor/generator MG set to a revolution speed that is lower than the idle speed of the engine. At the same time, the control of the engine E is changed to the feedback control with the idle speed being the target revolution speed. In the WSC drive mode, the engine revolution speed is maintained by the revolution speed feedback control of the motor/generator MG. In contrast to this, when the first clutch CL1 is disengaged, the engine revolution speed cannot be controlled to the idle speed by the motor/generator MG. Therefore, an engine self-rotation control is executed by the engine E itself.

Next, a hydraulic control of the second clutch CL2 that serves as a starter clutch when a changing operation from a neutral range (N-range) to a drive range (D-range) is made by driver's selecting lever operation will be explained.

In the present embodiment, as shown in FIG. 11, a pressure regulator valve 8a, a pressure reducing valve 8b and a clutch pressure control valve 8c are provided in the second clutch hydraulic unit 8 shown in FIG. 1, and a hydraulic pressure produced by the oil pump O/P is supplied to the second clutch CL2. Further, a hydraulic control unit 30, a pre-charge pressure control unit 32 and a capacity adjustment pressure control unit 33 are provided in the AT controller 7 shown in FIG. 1. By the hydraulic control unit 30 having the pre-charge pressure control unit 32 and the capacity adjustment pressure control unit 33 as higher units, the clutch pressure control valve (a linear solenoid valve) 8c that is a main element of the second clutch hydraulic unit 8 is directly controlled. The clutch pressure control valve 8c is duty-controlled by a command from the hydraulic control unit 30. By this control, the hydraulic pressure supplied to the second clutch CL2 as a working fluid pressure (a hydraulic fluid pressure) is controlled. Here, normally, a driving command according to a throttle opening is inputted to the clutch pressure control valve 8c.

The pre-charge pressure control unit 32 and the capacity adjustment pressure control unit 33 perform a control of a hold pressure (a hydraulic pressure for a piston stroke) upon engagement of the second clutch CL2 when the selecting operation is made from the neutral range (N-range) to the drive range (D-range). These pre-charge pressure control unit 32 and capacity adjustment pressure control unit 33 input a selection signal from the inhibitor switch 35 and ON/OFF information from the brake switch 36. Further, the capacity adjustment pressure control unit 33 inputs sensor information from the oil temperature sensor 37. As described above, the brake switch 36 is turned ON and turned OFF in response to the brake pedal depression operation, and by this ON/OFF output, the brake-operating/nonoperating state can be judged.

The pre-charge pressure control unit 32 grasps or recognizes that the range is changed from the N-range and the D-range is selected, by a selection range signal (a range change signal) from the inhibitor switch 35 which is generated when selection is done by the selecting lever operation, i.e. by a range signal corresponding to a selected range. The pre-charge pressure control unit 32 then outputs a control command to the hydraulic control unit 30 according to the ON/OFF information from the brake switch 36, and performs such control that after temporarily rapidly increasing the hydraulic pressure supplied to the second clutch CL2, rapidly decreases the hydraulic pressure.

Figure 12:
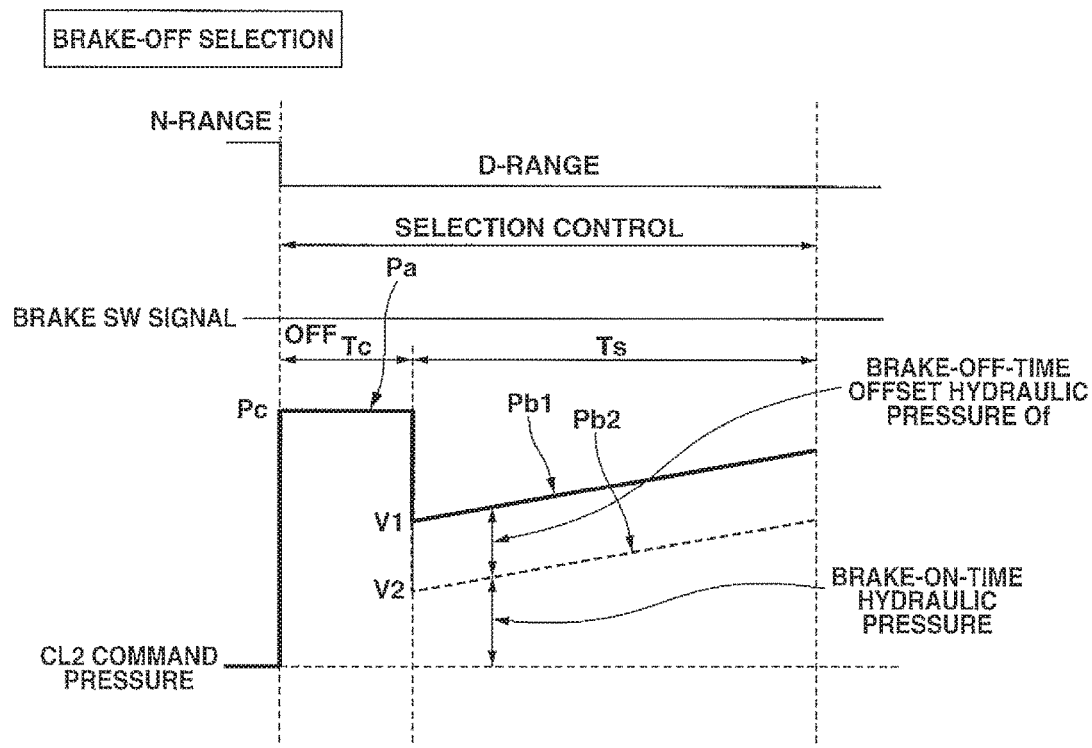
FIG. 12 is a time chart showing change of a hydraulic pressure of a second clutch when performing a selection control from N-range to D-range.

As shown in FIG. 12, the hydraulic pressure controlled through the pre-charge pressure control unit 32 is rapidly increased up to a constant pressure Pc at the same time as the selecting operation from the N-range to the D-range, and becomes a shelf pressure Pa. This shelf pressure Pa continues for a predetermined time Tc, and the hydraulic pressure is rapidly decreased up to a predetermined pressure V1. This step-shaped shelf pressure Pa for pre-charge is pre-charged into an oil chamber of the second clutch CL2 that is engaged upon the selecting operation from the N-range to the D-range.

On the other hand, the capacity adjustment pressure control unit 33 receives a signal of completion of the pre-charge from the pre-charge pressure control unit 32, and also receives the ON/OFF information of the brake switch 36, then outputs a control command to the hydraulic control unit 30. The capacity adjustment pressure control unit 33 controls the hydraulic pressure supplied to the second clutch CL2 according to the ON/OFF information of the brake switch 36 so that the hydraulic pressure is gradually increased at a predetermined gradient from a rapid decrease point P1 of the shelf pressure Pa, as a capacity adjustment pressure Pb1. That is, the capacity adjustment pressure Pb1 that is the hydraulic pressure controlled by the capacity adjustment pressure control unit 33 is so-called backlash removal pressure (or a play removal pressure) for the second clutch CL2. As shown in FIG. 12, after a lapse of the predetermined time Tc from the selecting operation from the N-range to the D-range, the hydraulic pressure is gradually increased at the predetermined gradient (a predetermined speed) from the predetermined pressure V1 for a control time Ts until the second clutch CL2 is fully engaged, in response to the ON/OFF information of the brake switch 36.

FIG. 12 shows a hydraulic pressure change during a selection control in a case where the brake is in OFF state when the selecting operation is done from the N-range to the D-range. In the drawing, a change of the capacity adjustment pressure at a time of the brake-OFF is shown by a solid line Pb1, and a change of the capacity adjustment pressure at a time of the brake-ON is shown by a broken line Pb2. Therefore, the capacity adjustment pressure Pb2 at the time of the brake-ON is controlled so as to be gradually increased at a predetermined gradient from a rapid decrease point V2 of the shelf pressure Pa.

As can be seen in FIG. 12, with regard to a command hydraulic pressure for the capacity adjustment pressures Pb1 and Pb2 subsequent to the pre-charge shelf pressure Pa, the command hydraulic pressure is previously set so that the command hydraulic pressure for the capacity adjustment pressure Pb1 at the time of the brake-OFF is greater than the command hydraulic pressure for the capacity adjustment pressure Pb2 at the time of the brake-ON. Further, the command hydraulic pressure for the capacity adjustment pressure Pb2 at the time of the brake-ON and an offset hydraulic pressure Of at the time of the brake-OFF are each previously set. The command hydraulic pressure for the brake-OFF-time capacity adjustment pressure Pb1 is set by adding the brake-OFF-time offset hydraulic pressure Of to the command hydraulic pressure for the brake-ON-time capacity adjustment pressure Pb2. The brake-ON-time capacity adjustment pressure Pb2 and the brake-OFF-time capacity adjustment pressure Pb1 are selectively switched in response to the ON/OFF information of the brake switch 36. However, a command hydraulic pressure for the pre-charge shelf pressure Pa is not change by the brake-ON/OFF.

Figure 13A:
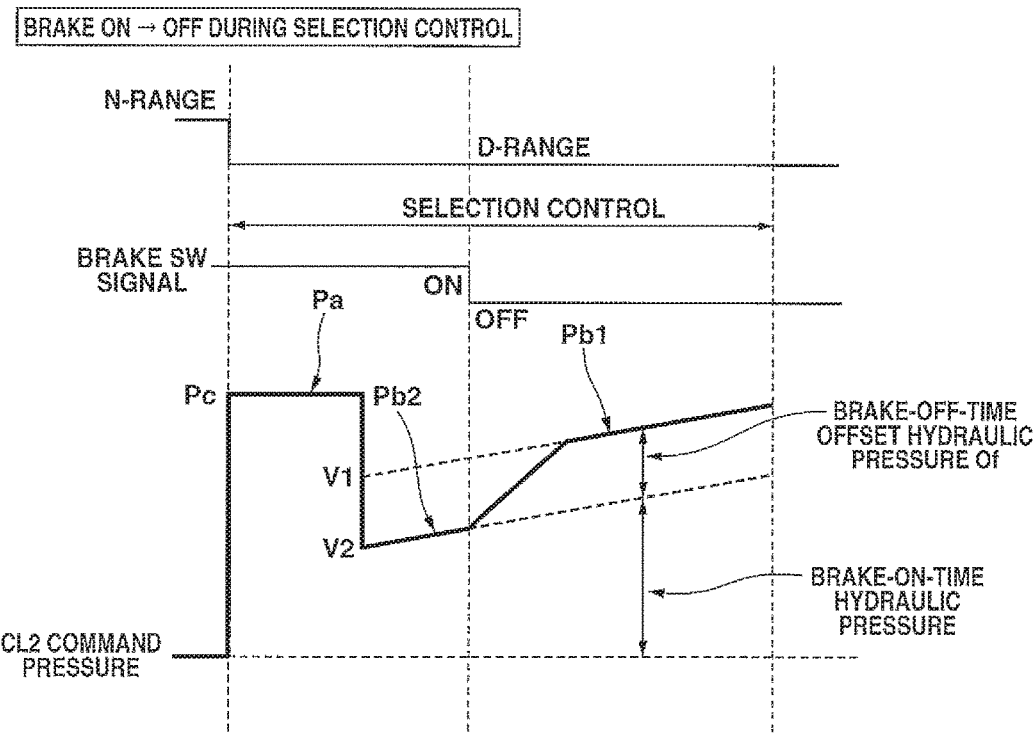
FIGS. 13A and 13B are time charts showing change of the hydraulic pressure of the second clutch when performing the selection control from N-range to D-range.
Figure 13B:
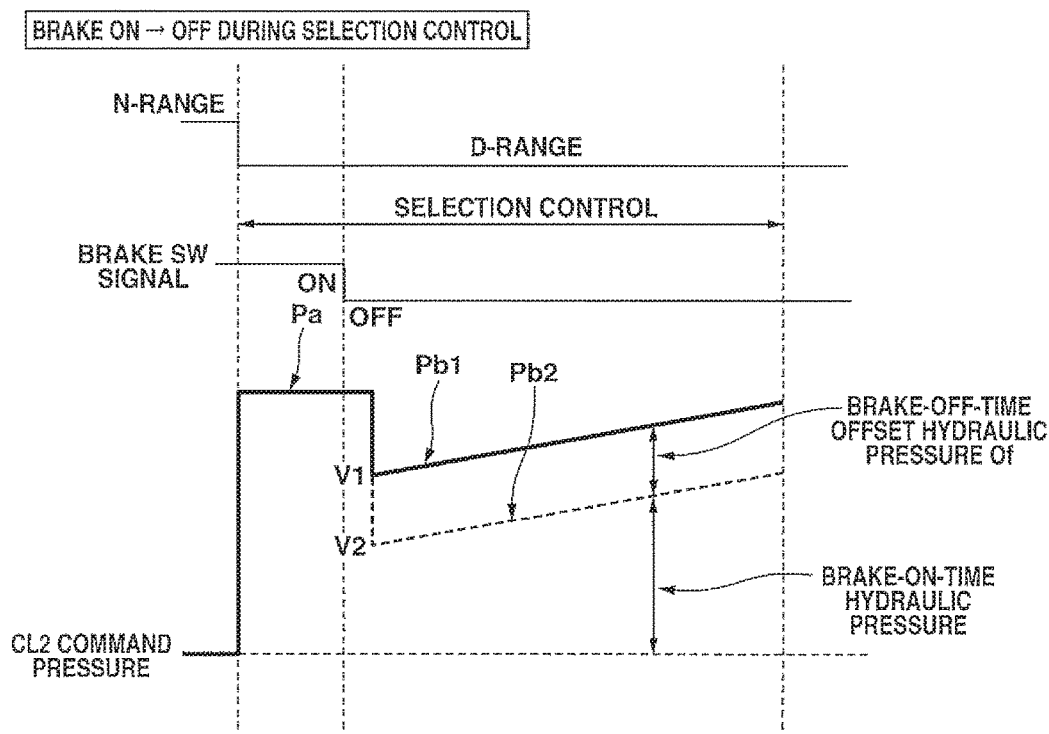

FIGS. 13A and 13B are drawings showing the hydraulic pressure change when the brake is changed from the brake-ON state to the brake-OFF state during the selection control based on the selecting operation from the N-range to the D-range. FIG. 13A shows a case where the brake is changed from the brake-ON state to the brake-OFF state during the progress of the production of the brake-ON-time capacity adjustment pressure Pb2. FIG. 13B shows a case where the brake is changed from the brake-ON state to the brake-OFF state during the progress of the production of the pre-charge shelf pressure Pa.

As shown in FIG. 13A, in the case where the brake is changed from the brake-ON state to the brake-OFF state when the production of the capacity adjustment pressure Pb2 according to the brake-ON state is in progress, a command of the brake-OFF-time command hydraulic pressure obtained by adding the brake-OFF-time offset hydraulic pressure Of to the brake-ON-time command hydraulic pressure is given at a timing when the brake is changed from the brake-ON to the brake-OFF, then the hydraulic pressure is increased to the capacity adjustment pressure Pb1 according to the brake-OFF state. In this case, the hydraulic pressure is not increased at once from the brake-ON-time capacity adjustment pressure Pb2 to the capacity adjustment pressure Pb1 according to the brake-OFF state, but gradually increased by gradually increasing the brake-OFF-time offset hydraulic pressure Of that is added to the brake-ON-time capacity adjustment pressure Pb2 at a predetermined increase gradient (a predetermined speed). This can be achieved by, for instance, a hydraulic pressure rate-of-increase limiter function that is provided in the capacity adjustment pressure control unit 33 of FIG. 11.

Further, as shown in FIG. 13B, in the case where the brake is changed from the brake-ON state to the brake-OFF state when the production of the pre-charge shelf pressure Pa is in progress, after the duration time Tc (see FIG. 12) of the pre-charge shelf pressure Pa elapses, a command hydraulic pressure of the brake-OFF-time capacity adjustment pressure Pb1, which is higher than the brake-ON-time capacity adjustment pressure Pb2, with the brake-OFF-time offset hydraulic pressure Of added to the brake-ON-time capacity adjustment pressure Pb2, is given.

Figure 14A:
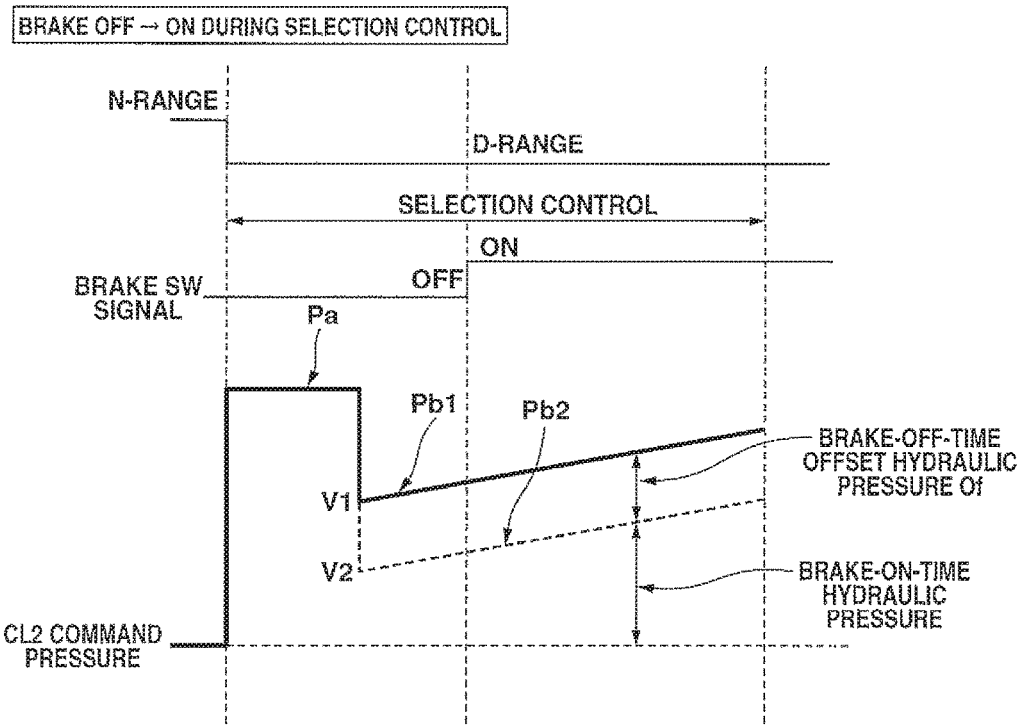
FIGS. 14A and 14B are time charts showing change of the hydraulic pressure of the second clutch when performing the selection control from N-range to D-range.
Figure 14B:
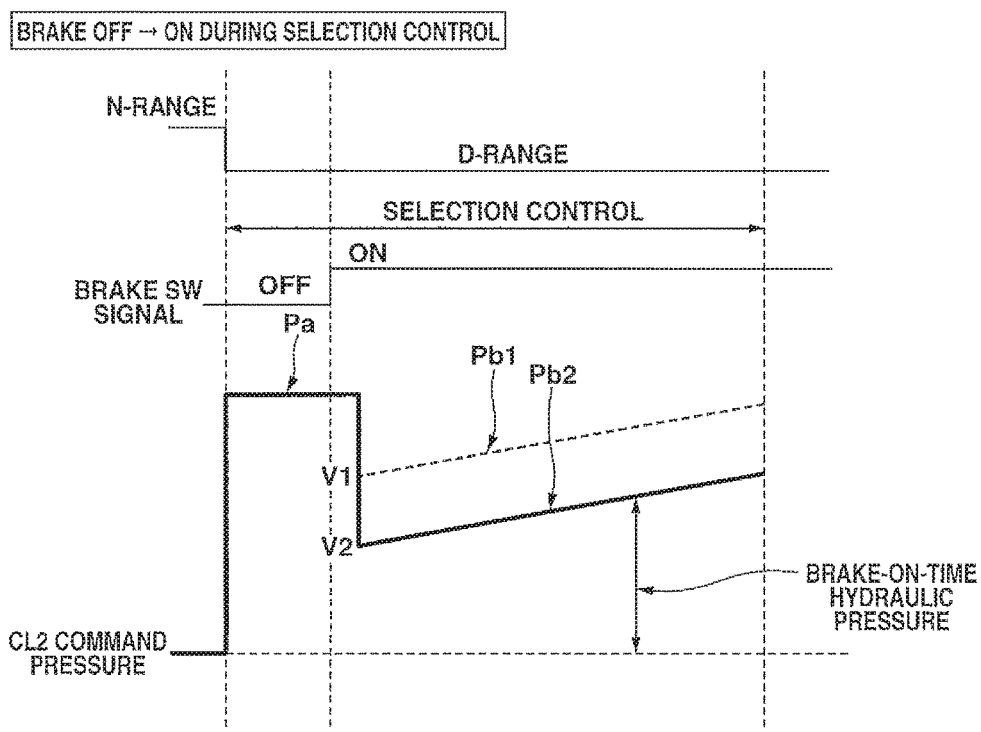

Likewise, FIGS. 14A and 14B show the hydraulic pressure change when the brake is changed from the brake-OFF state to the brake-ON state during the selection control based on the selecting operation from the N-range to the D-range. FIG. 14A shows a case where the brake is changed from the brake-OFF state to the brake-ON state during the progress of the brake-OFF-time capacity adjustment pressure Pb1. FIG. 14B shows a case where the brake is changed from the brake-OFF state to the brake-ON state during the progress of the production of the pre-charge shelf pressure Pa.

As shown in FIG. 14A, in the case where the brake is changed from the brake-OFF state to the brake-ON state when the production of the capacity adjustment pressure Pb1 according to the brake-OFF state is in progress, change to the production of the capacity adjustment pressure Pb2 according to the brake-ON state is not done with the ON/OFF information of the brake switch 36 disregarded, but the production of the capacity adjustment pressure Pb1 according to the brake-OFF state is maintained. That is, in the case of FIG. 14A, the ON/OFF information of the brake switch 36 is disregarded, and the selection control is performed with the capacity adjustment pressure Pb1 according to the brake-OFF state continuing until the completion of the clutch engagement.

Further, as shown in FIG. 14B, in the case where the brake is changed from the brake-OFF state to the brake-ON state when the production of the pre-charge shelf pressure Pa is in progress, after the duration time Tc (see FIG. 12) of the pre-charge shelf pressure Pa elapses, a command hydraulic pressure of the capacity adjustment pressure Pb2 according to the brake-ON state is given. As a matter of course, the capacity adjustment pressure Pb2 according to the brake-ON state is lower than the capacity adjustment pressure Pb1 according to the brake-OFF state by the brake-OFF-time offset hydraulic pressure Of.

Figure 15:
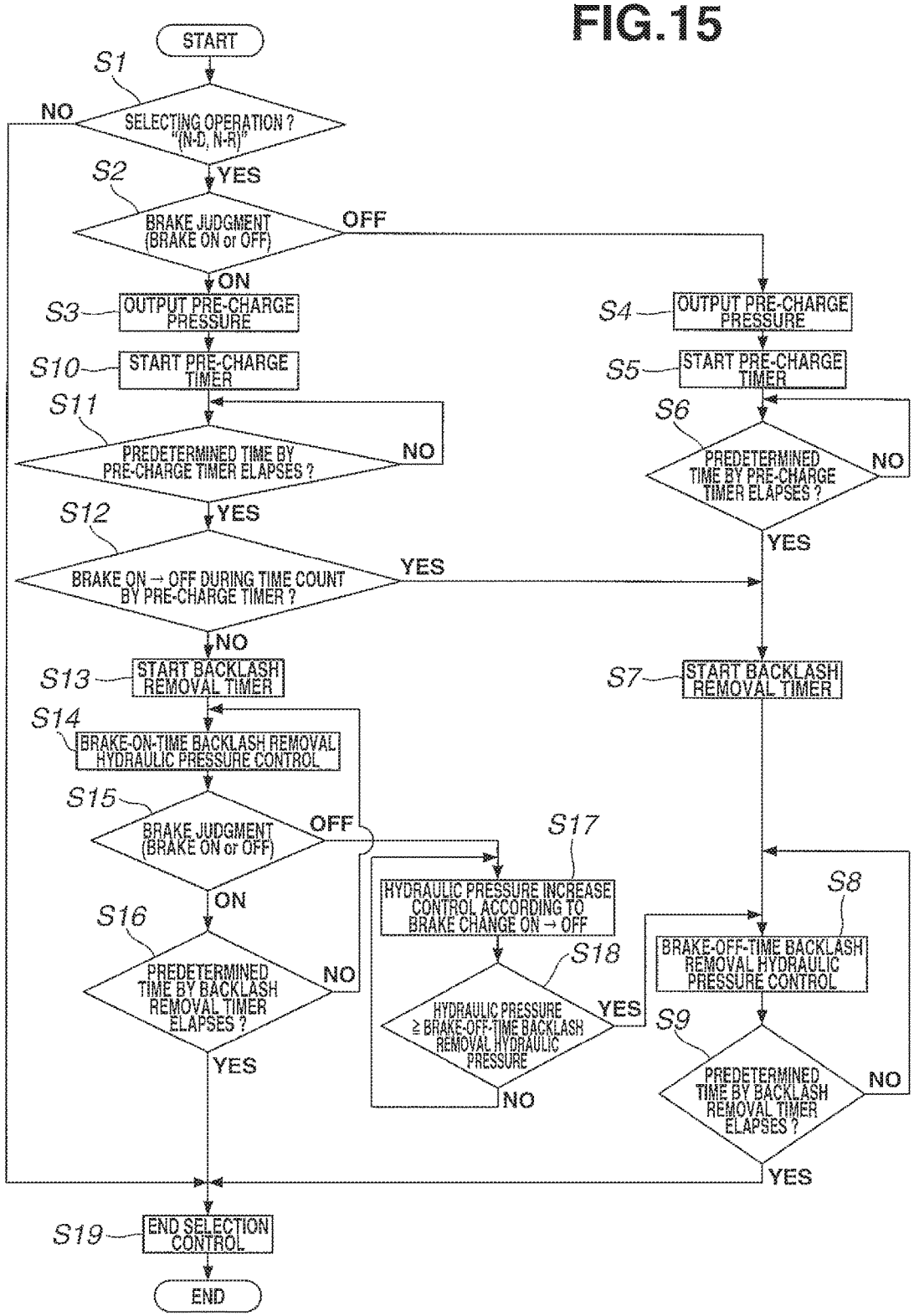
FIG. 15 is a flow chart to perform processes of the hydraulic pressure change shown in FIGS. 12 to 14A and 14B.

FIG. 15 is a flow chart showing an example of a control procedure executed by the hydraulic control unit 30, the pre-charge pressure control unit 32 and the capacity adjustment pressure control unit 33 shown in FIG. 11, to produce such hydraulic pressure change as shown in FIGS. 12A to 14B. The process of FIG. 15 is repeated at a predetermined time interval.

When judged that the selecting operation from the N-range to the D-range is made at step S1 in FIG. 15, the routine proceeds to step S2. At step S2, a judgment is made as to whether the brake is in the ON state or the OFF state. If the brake is in the ON state, the routine proceeds to step S3. If the brake is in the OFF state, the routine proceeds to step S4.

At step S4 to which the routine proceeds due to the condition of the brake-OFF state, since this state corresponds to FIG. 12, the command hydraulic pressure for the pre-charge shelf pressure Pa as shown in FIG. 12 is outputted, and the pre-charge shelf pressure Pa is produced. At the same time, time count to check the duration time Tc of the pre-charge shelf pressure Pa starts by a pre-charge timer at step S5. The duration time Tc of the pre-charge shelf pressure Pa ends at a time when a predetermined time by the pre-charge timer elapses as a condition (at step S6). That is, at steps S4 to S6, as shown in FIG. 12, the command hydraulic pressure is rapidly increased at once from a normal hydraulic pressure up to a hydraulic pressure Pc, and this hydraulic pressure is maintained for the time Tc, then the command hydraulic pressure is rapidly decreased at once up to the hydraulic pressure V1 after a lapse of the time Tc, thereby producing the pre-charge shelf pressure Pa.

At step S7 in FIG. 15, time count to check the duration time Ts of the capacity adjustment pressure Pb1 of FIG. 12 starts by a backlash removal timer. At the same time, at the next step S8, a backlash removal hydraulic pressure control at the time of the brake-OFF (a brake-OFF-time backlash removal hydraulic pressure control) is performed. Here, in the flow chart in FIG. 15, the hydraulic pressure control to produce the above described capacity adjustment pressure Pb1 or capacity adjustment pressure Pb2 is called simply "backlash removal". Thus, at step S8, as shown in FIG. 12, subsequent to the above pre-charge shelf pressure Pa, by gradually increasing the command hydraulic pressure for the time Ts, the capacity adjustment pressure Pb1 is produced. The capacity adjustment pressure Pb1 here is, as described above, the hydraulic pressure obtained by adding the brake-OFF-time offset hydraulic pressure Of to the command hydraulic pressure for the brake-ON-time capacity adjustment pressure Pb2.

Afterwards, at a time when a predetermined time by the backlash removal timer elapses as a condition at step S9, which means that the time Ts of FIG. 12 elapses, the selection control is ended at the next step S19. After the end of the selection control by a lapse of the time Ts, the command hydraulic pressure is returned to the normal hydraulic pressure.

On the other hand, at step S3 to which the routine proceeds due to the condition of the brake-ON state at step S2, since this state corresponds to FIG. 13A or 13B, the command hydraulic pressure for the pre-charge shelf pressure Pa as shown in FIG. 13A or 13B is outputted, and the pre-charge shelf pressure Pa is produced. At the same time, time count starts by the pre-charge timer at step S10. The duration time Tc (FIG. 12) of the pre-charge shelf pressure Pa ends at a time when a predetermined time by the pre-charge timer elapses as a condition (at step S11).

At step S12, a judgment is made as to whether or not the brake state is changed from the ON state to the OFF state during the progress of the time count by the pre-charge timer, namely, that a judgment is made as to whether or not the brake state is changed from the ON state to the OFF state during the progress of the production of the pre-charge shelf pressure Pa of FIGS. 13A and 13B. If the brake state is changed from the ON state to the OFF state during the progress of the production of the pre-charge shelf pressure Pa, since this state corresponds to FIG. 13B, the routine proceeds to step S7. Process at step S7 and processes after step S7 are the same as those described above. In short, as the brake-OFF-time backlash removal hydraulic pressure control at step S8, as shown in FIG. 13B, subsequent to the above pre-charge shelf pressure Pa, by gradually increasing the command hydraulic pressure for the time Ts (FIG. 12), the brake-OFF-time capacity adjustment pressure Pb1 is produced. The capacity adjustment pressure Pb1 here is, as described above, the hydraulic pressure obtained by adding the brake-OFF-time offset hydraulic pressure Of to the command hydraulic pressure for the brake-ON-time capacity adjustment pressure Pb2.

As a result of the judgment as to whether or not the brake state is changed from the ON state to the OFF state during the progress of the time count by the pre-charge timer at step S12, if the brake remains unchanged in the ON state without changing from the ON state to the OFF state, since this state corresponds to FIG. 13A, process at step S13 and processes after step S13 are executed. That is, as a backlash removal hydraulic pressure control at the time of the brake-ON (a brake-ON-time backlash removal hydraulic pressure control) at steps S13 and S14, as shown in FIG. 13A, subsequent to the above pre-charge shelf pressure Pa, by gradually increasing the command hydraulic pressure from the rapid decrease point V2 of the shelf pressure Pa, the brake-ON-time capacity adjustment pressure Pb2 is produced. As mentioned above, the capacity adjustment pressure Pb2 here is the hydraulic pressure that is lower than the brake-OFF-time capacity adjustment pressure Pb1 by the brake-OFF-time offset hydraulic pressure Of.

Then, during the execution of the brake-ON-time backlash removal hydraulic pressure control, in other words, during the progress of the time count by the backlash removal timer at step S13, a judgment is made as to whether or not the brake remains unchanged in the ON state at step S15. If the brake remains unchanged in the ON state, the brake-ON-time backlash removal hydraulic pressure control is performed until a predetermined time by the backlash removal timer elapses at step S16. The selection control is then ended at the next step S19.

On the other hand, when judged at step S15 that the brake state is changed from the ON state to the OFF state during the execution of the brake-ON-time backlash removal hydraulic pressure control, in other words, during the progress of the time count by the backlash removal timer at step S13, since this state corresponds to FIG. 13A, the routine proceeds to the next step S17. At step S17, the hydraulic pressure increase control according to the change from the brake-ON state to the brake-OFF state is performed.

The hydraulic pressure increase control at step S17 is the hydraulic pressure control of the case where the brake is changed from the brake-ON state to the brake-OFF state when the production of the capacity adjustment pressure Pb2 according to the brake-ON state is in progress, as previously explained on the basis of FIG. 13A. Therefore, the command of the brake-OFF-time capacity adjustment pressure Pb1 obtained by adding the brake-OFF-time offset hydraulic pressure Of to the command pressure of the brake-ON-time capacity adjustment pressure Pb2 is given at a timing when the brake is changed from the brake-ON to the brake-OFF, then the hydraulic pressure is increased to the capacity adjustment pressure Pb1 according to the brake-OFF state. In this case, the hydraulic pressure is not increased at once from the capacity adjustment pressure Pb2 according to the brake-ON state to the capacity adjustment pressure Pb1 according to the brake-OFF state, but gradually increased by gradually increasing the brake-OFF-time offset hydraulic pressure Of that is added to the brake-ON-time capacity adjustment pressure Pb2 at the predetermined increase gradient (the predetermined speed) (so-called gradual pressure increase).

Subsequently, when the hydraulic pressure reaches a level of the capacity adjustment pressure Pb1 according to the brake-OFF state by the gradual pressure increase of the brake-OFF-time offset hydraulic pressure Of by the process at step S17 (at step S18), the routine proceeds to step S8, and the above-mentioned brake-OFF-time backlash removal hydraulic pressure control is performed. Further, at a time when a predetermined time by the backlash removal timer elapses as a condition at step S9, the selection control is ended at the next step S19.

As explained above, when performing the selection control based on the selecting operation from the N-range to the D-range, it is possible, at the time of the brake-OFF, to provide the hydraulic pressure to the capacity adjustment pressure Pb1 produced from the rapid decrease point of the step-shaped pre-charge shelf pressure Pa so as to be higher than the capacity adjustment pressure at the time of the brake-ON by the amount of the offset hydraulic pressure Of. On the other hand, it is possible, at the time of the brake-ON, to provide the hydraulic pressure to the capacity adjustment pressure Pb2 so as to be lower than the capacity adjustment pressure at the time of the brake-OFF by the amount of the offset hydraulic pressure Of.

Here, although FIGS. 12 to 15 show an example of the case where the selecting operation is made from the N-range to the D-range, the same processes are executed also in a case where the selecting operation is made from the N-range to an R-range.

Further, in light of a characteristic change by temperature of the working fluid, especially the brake-OFF-time capacity adjustment pressure Pb1 is increased/decreased according to the fluid oil temperature. The capacity adjustment pressure control unit 33 is previously provided with a map of an oil temperature-offset hydraulic pressure characteristic as shown in FIG. 16 while receiving sensor information from the oil temperature sensor 37, and the offset hydraulic pressure Of is increased/decreased so that the offset hydraulic pressure Of is corrected according to the fluid oil temperature.

Figure 16:
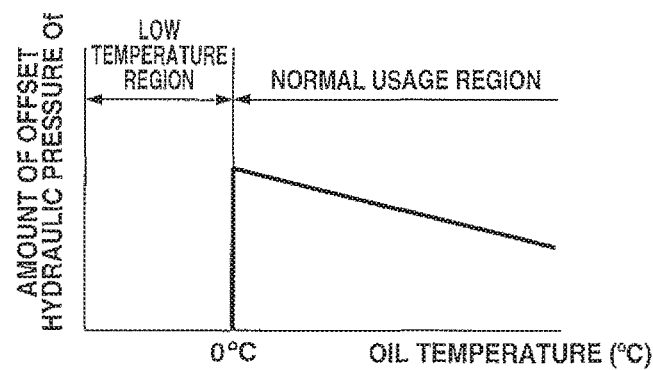
FIG. 16 is a plot showing a relationship between an offset hydraulic pressure (an offset amount) and an oil temperature of FIGS. 12 to 14A and 14B.

For instance, as shown in FIG. 16, temperature below 0° C. is set as a low temperature region, and temperature of 0° C. or higher is set as a normal usage region. Then, in the low temperature region, the offset hydraulic pressure Of is substantially set to zero. In the normal usage region, the offset hydraulic pressure Of is controlled so as to be gradually decreased with increase of the fluid oil temperature. This means that, as the brake-OFF-time capacity adjustment pressure Pb1, the offset hydraulic pressure Of that is added to the brake-ON-time capacity adjustment pressure Pb2 is increased/decreased according to the fluid oil temperature. The brake-OFF-time capacity adjustment pressure Pb1 is consequently increased/decreased according to the fluid oil temperature. With this control, especially when engaging the second clutch CL2 at the time of the brake OFF, it is possible to avoid variations caused by an influence of the fluid oil temperature.

Figure 17:
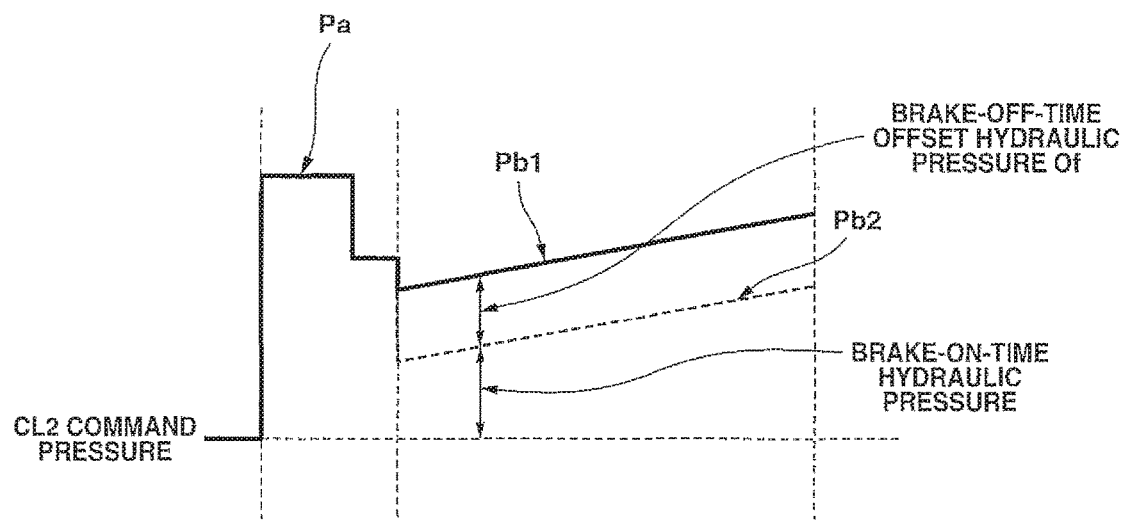
FIG. 17 is an explanatory drawing showing a modified example of a pre-charge pressure (a shelf pressure) of FIG. 12.

Further, FIGS. 12 to 14B show, as an example, the one stepped pre charge shelf pressure Pa. However, high-and-low two-stepped pre-charge shelf pressure as shown in FIG. 17 could be set as necessary.

According to the present embodiment, when performing the selection control based on the selecting operation from the N-range to the D-range, the capacity adjustment pressure Pb1, produced from the rapid decrease point of the step-shaped pre-charge shelf pressure Pa, at the time of the brake-OFF is set to be higher than the capacity adjustment pressure Pb2 at the time of the brake-ON by the amount of the offset hydraulic pressure Of. In a case of the brake OFF state, it is conceivable that the driver desires the vehicle startability and driver's sensitivity to the selection shock is low. Therefore, by setting the capacity adjustment pressure to be high, the second clutch CL2 can be immediately engaged, and good vehicle startability can be achieved. On the other hand, in a case of the brake-ON state, it is conceivable that the driver's sensitivity to the vehicle startability is low by setting the capacity adjustment pressure to be lower than that of the brake-OFF state, the selection shock is further reduced.

In addition, as shown in FIG. 13A, the hydraulic pressure is increased to the brake-OFF-time capacity adjustment pressure Pb1 by adding the offset hydraulic pressure Of to the brake-ON-time capacity adjustment pressure Pb2 when the brake is changed from the brake-ON state to the brake-OFF state during the progress of the selection control based on the selecting operation from the N-range to the D-range. In this case, since the offset hydraulic pressure Of is gradually increased, it is possible to reduce the shock when the brake is changed from the brake-ON state to the brake-OFF state. Although the case, as an example, where the oil pressure controller is applied to the hybrid vehicle shown in FIG. 1 is explained in the present embodiment, the oil pressure controller could be applied to other vehicles as long as the vehicles are provided with the starter clutch. Further, although FIG. 1 shows an FR-type hybrid vehicle, the oil pressure controller could be applied to an FF-type hybrid vehicle.

Furthermore, in the present embodiment, the command hydraulic pressure is gradually increased immediately after the rapid decrease of the step-shaped pre-charge shelf pressure Pa, and the capacity adjustment pressure of the starter clutch is produced. However, the capacity adjustment pressure of the starter clutch could be produced by holding the command hydraulic pressure for a predetermined time after the rapid decrease of the step-shaped pre-charge shelf pressure Pa and gradually increasing the command hydraulic pressure.

The invention claimed is:

1. An oil pressure controller for an automatic transmission, the oil pressure controller producing a pre-charge shelf pressure supplied to a starter clutch by rapidly decreasing a command hydraulic pressure to the starter clutch after temporarily rapidly increasing the command hydraulic pressure and also producing a capacity adjustment pressure of the starter clutch by gradually increasing the command hydraulic pressure after decreasing the pre-charge shelf pressure when a selecting operation is made from a neutral range to a drive range, the oil pressure controller comprising:
a brake state detecting unit that detects a brake-operating/nonoperating state of a vehicle mounting the automatic transmission, and
the command hydraulic pressure in the brake-nonoperating state being set to be higher than the command hydraulic pressure in the brake-operating state, and
when a brake is changed from the brake-operating state to the brake-nonoperating state during the progress of production of the capacity adjustment pressure on the basis of the selecting operation from the neutral range to the drive range, the capacity adjustment pressure in the brake-nonoperating state being produced while gradually increasing the capacity adjustment pressure in the brake-operating state.

2. The oil pressure controller for the automatic transmission as claimed in claim 1, wherein:
the capacity adjustment pressure in the brake-nonoperating state is a pressure obtained by adding a predetermined offset hydraulic pressure amount to the capacity adjustment pressure in the brake-operating state.

3. The oil pressure controller for the automatic transmission as claimed in claim 2, wherein:
when a brake is changed from the brake-operating state to the brake-nonoperating state during the progress of production of the capacity adjustment pressure on the basis of the selecting operation from the neutral range to the drive range, the capacity adjustment pressure in the brake-nonoperating state is produced by adding the offset hydraulic pressure amount to the capacity adjustment pressure in the brake-operating state while gradually increasing the offset hydraulic pressure amount.

4. The oil pressure controller for the automatic transmission as claimed in claim 2, wherein:
the offset hydraulic pressure amount is increased or decreased according to temperature of a working fluid.

* * * * *